United States Patent
Nishiyama et al.

(10) Patent No.: US 8,619,666 B2
(45) Date of Patent: Dec. 31, 2013

(54) WIRELESS COMMUNICATIONS SYSTEM AND WIRELESS COMMUNICATIONS DEVICE

(75) Inventors: Fumihiro Nishiyama, Saitama (JP); Yasunori Maeshima, Tokyo (JP); Satoshi Konya, Kanagawa (JP); Nobuo Namekawa, Kanagawa (JP); Tomonari Yamagata, Kanagawa (JP); Yuhei Hashimoto, Tokyo (JP); Itaru Maekawa, Nagano (JP)

(73) Assignee: Sony Corporation, Tokyo (JP)

( * ) Notice: Subject to any disclaimer, the term of this patent is extended or adjusted under 35 U.S.C. 154(b) by 999 days.

(21) Appl. No.: 11/856,495

(22) Filed: Sep. 17, 2007

(65) Prior Publication Data

US 2008/0095089 A1    Apr. 24, 2008

(30) Foreign Application Priority Data

Sep. 21, 2006 (JP) ................. 2006-256396

(51) Int. Cl.
*H04B 7/212* (2006.01)
(52) U.S. Cl.
USPC ............ 370/324; 370/338; 370/349; 370/350
(58) Field of Classification Search
USPC ................. 370/329, 338, 343, 324, 349, 350
See application file for complete search history.

(56) References Cited

U.S. PATENT DOCUMENTS

| | | | |
|---|---|---|---|
| 7,274,708 B2* | 9/2007 | Benveniste | 370/445 |
| 7,315,528 B2* | 1/2008 | Leeuwen | 370/329 |
| 7,502,365 B2 | 3/2009 | Yamagata | |
| 7,508,781 B2* | 3/2009 | Liu et al. | 370/311 |
| 7,551,581 B2* | 6/2009 | Stephens et al. | 370/329 |
| 7,554,966 B2* | 6/2009 | Edwards et al. | 370/349 |
| 7,586,864 B2 | 9/2009 | Aoki | |
| 7,606,213 B2* | 10/2009 | Mishra et al. | 370/349 |
| 7,623,863 B2* | 11/2009 | Chen et al. | 455/436 |
| 7,756,198 B2* | 7/2010 | Chen et al. | 375/225 |
| 7,873,002 B2* | 1/2011 | Cai | 370/329 |
| 8,116,290 B2* | 2/2012 | Moorti et al. | 370/338 |
| 8,254,366 B2* | 8/2012 | Mishra et al. | 370/349 |
| 2005/0025131 A1 | 2/2005 | Ko et al. | |
| 2005/0068895 A1 | 3/2005 | Stephens et al. | |
| 2007/0217378 A1* | 9/2007 | Moorti et al. | 370/338 |
| 2008/0070582 A1* | 3/2008 | Cai | 455/450 |

FOREIGN PATENT DOCUMENTS

| | | |
|---|---|---|
| CN | 1336042 A | 2/2002 |
| CN | 1819538 | 8/2006 |
| EP | 1 169 781 B1 | 10/2004 |

(Continued)

OTHER PUBLICATIONS

European Search Report issued Sep. 22, 2010, in Munich, in corresponding European Patent Application No. 07 25 3733.

(Continued)

*Primary Examiner* — Brian O'Connor
(74) *Attorney, Agent, or Firm* — Finnegan, Henderson, Farabow, Garrett & Dunner, L.L.P.

(57) ABSTRACT

A wireless communications system for performing data communications between a data transmission side wireless communications device and a data receiving side wireless communications device. In the system, random back-off access control is performed until a connection is established between the data transmission side wireless communications device and the data receiving side wireless communications device. Then, after the connection is established, asymmetric IFS access control is performed.

11 Claims, 8 Drawing Sheets

(56) References Cited

FOREIGN PATENT DOCUMENTS

| | | |
|---|---|---|
| EP | 1 519 518 A2 | 3/2005 |
| EP | 1 681 806 A1 | 7/2006 |
| JP | 2003-179610 | 6/2003 |
| JP | 2005-12762 | 1/2005 |
| JP | 2005-252692 | 9/2005 |
| JP | 2006-222608 | 8/2006 |
| WO | WO 03/026215 | 3/2003 |
| WO | WO 2005-039228 | 4/2005 |

OTHER PUBLICATIONS

The Second Office Action From State Intellectual Property Office of the People's Republic of China, for corresponding Chinese Application No. 2007101519792, issued Jun. 25, 2010.

* cited by examiner

500 : TRANSMISSION FRAME

WIRELESS COMMUNICATIONS SYSTEM AND WIRELESS COMMUNICATIONS DEVICE

CROSS REFERENCES TO RELATED APPLICATIONS

The present invention contains subject matter related to Japanese Patent Application JP 2006-256396 filed in the Japan Patent Office on Sep. 21, 2006, the entire contents of which being incorporated herein by reference.

BACKGROUND OF THE INVENTION

1. Field of the Invention

The present invention relates to a wireless communications system and a wireless communications device, and more particularly to a close proximity wireless communications system that focuses on the importance of bandwidth protection between wireless communications devices, and a wireless communications device that forms a part of the close proximity wireless communications system.

2. Description of the Related Art

In known wireless communications systems, there are occasions when electric power is needlessly consumed even when data transfer does not have to be performed. For example, in an autonomous distributed wireless communications system, each node must periodically transmit a beacon signal to notify its presence to other surrounding nodes. Alternatively, in a centrally controlled wireless communications system, each node must periodically respond to the central control node to notify its presence. In these situations, even if data transfer is not performed, electric power is wastefully consumed.

With regard to methods used for data transfer, in Carrier Sense Multiple Access/Collision Avoidance (CSMA/CA) access control that is typically used in 802.11a/b/g standards, a random back-off method is used as a way of evenly distributing bandwidth to each node within the wireless service area (for example, refer to Japanese Patent Application Publication No. JP-2006-222608). In the random back-off method, a random back-off is selected in each node before transmission, thereby allowing even use of bandwidth. Thus, it is possible to inhibit any particular node from monopolizing bandwidth.

FIG. 11 illustrates a concrete example of a known wireless communications system and shows devices #1 to #4 and their wireless communication ranges. This wireless communications system is envisaged for use in, for example, a wireless sensor module, and devices #1 to #4 could be imagined to be, for example, wireless sensor modules located in different rooms within a house. In this wireless sensor system, data is only transferred between the wireless sensor modules when the sensors detect a change.

FIG. 12 is an explanatory figure showing the transfer of data (temperature, humidity, vibration, brightness or the like) between the wireless sensor modules when the sensors detect a change in the wireless sensor system shown in FIG. 11. In FIG. 12, Tx represents transmitted data, and Rx represents received data. As can be seen from FIGS. 11 and 12, devices #1 and #2 are within each others communication ranges and communicate with each other, and devices #3 and #4 are within each others communication ranges and communicate with each other. Thus, the system is configured such that mutual interference does not occur.

SUMMARY OF THE INVENTION

However, as can be understood from FIGS. 11 and 12, in a system (situation) in which data transfer within the service area only takes place sporadically, and the data transfer is completed in a short time period, there is no particular need to evenly distribute bandwidth to each node. Moreover, in a system (situation) where data transfer takes place sporadically, use of an access method for evenly distributing bandwidth, such as a random back-off, has negative effects on electric power consumption and throughput since the time required for data transfer is lengthened.

In addition, because the known method is based on a configuration using an IEEE802.15.4 system that is typically used for ZigBee etc. or wireless LAN, communication for wireless bandwidth control is performed in addition to normal communication, which has a negative effect on electric power consumption, and requires the structure of the devices to be more complicated.

Further, the above-described issues are a concern even in a case like that shown in FIG. 13 where the wireless service area is small. More specifically, in a "peer-to-peer" wireless communications system like that shown in FIG. 13, communication between device #1 and device #2 has an almost negligible impact on communication between device #3 and device #4. Further, even if interference does occur, it is possible for the position of the pair of devices #1 and #2 and the position of the pair of devices #3 and #4 shown in FIG. 13 to be separated slightly to prevent interference. Accordingly, the devices #1 to #4 can mutually maintain good communication. Moreover, the communication range, which is a few centimeters, can easily be adjusted by the user. Thus, the key issue of concern is bandwidth protection between the communication terminals, rather than preventing interference and even distribution of wireless bandwidth.

The present invention addresses the above-identified, and other problems associated with known systems and devices and provides a new and innovative wireless communications system and wireless communications device that provides an efficient method for establishing, maintaining, and terminating a wireless connection that is used for data transfer.

According to an embodiment of the present invention, there is provided a wireless communications system for performing data communications between a data transmission side wireless communications device and a data receiving side wireless communications device. The wireless communications system of the present invention performs asymmetric IFS access control. More specifically, a connection is established between the data transmission side wireless communications device and the data receiving side wireless communications device, and once the connection is established, a transmission side inter frame space assigned to the data transmission side wireless communications device and a receiving side inter frame space assigned to the data receiving side wireless communications device are asymmetrically assigned.

According to this system, after the connection is established, asymmetric IFS access control is performed instead of random back-off control. As a result, control is performed such that surrounding nodes are only detected when it is necessary to transfer data. Thus a method is provided that allows the process of establishing, maintaining and disconnecting a wireless connection for data transfer to be performed more efficiently. The described wireless communications system is particularly useful in the case that data transfer is performed sporadically, or the case that the wireless service area is small.

Further, the configuration of the invention does not use an IEE802.15.4 system that is typically used for ZigBee etc. or wireless LAN as in the known technology, and thus there is no need to perform communication for wireless bandwidth control in addition to normal communication. Accordingly, the invention offers benefits from the point of view of power consumption, and does not require a complicated device structure.

The wireless communications system of the present invention can be applied in various ways. A variety of examples of these applications are described below.

Until the connection of the data transmission side wireless communications system and the data receiving side wireless communications device is established, random back-off access control may be performed in which bandwidth is evenly distributed to the data transmission side wireless communications device and the data receiving side wireless communications device. As a result of performing access control using a random back-off until the connection is established, it is possible to reduce collision of response transmissions in the case that a plurality of wireless communications devices are present within the wireless communication range.

After the connection between the data transmission side wireless communications device and the data receiving side wireless communications device is established, the data transmission side wireless communications device may continuously transmit data until data transmission is completed. By continuously transmitting data in this manner, it is possible to block transmissions from other wireless communications devices.

The switching procedure for the access control may be performed, for example, in the following manner. The data transmission side wireless communications device transmits a connection request frame (C-Req) to surrounding wireless communications devices when it is necessary to transfer data, and the data receiving side wireless communications device, which receives the connection request, transmits a connection acceptance (C-Acc) frame to the data transmission side wireless communications device. Then, the data transmission side wireless communications device transmits a response frame (ACK) that responds to the connection acceptance and simultaneously switches the access control (for example, random back-off) to the asymmetric IFS access control, and the data receiving side wireless communications device, which receives the response frame, switches the access control (for example, random back-off) to the asymmetric IFS access control.

When it is necessary to transmit data to the data receiving side wireless communications device, the data receiving side wireless communications device may use a section of an information field of a frame receipt acknowledgment that is transmitted to the data transmission side wireless communications device to provide notification to the data transmission side wireless communications device that there is data that needs to be transmitted from the data receiving side wireless communications device. In addition, when the data transmission side wireless communications device receives notification that there is data that needs to be transmitted from the data receiving side wireless communications device, the data transmission side wireless communications device may set a determined inter frame space (SIFS+Trfb) that is sufficient for the data receiving side wireless communications device to transmit data.

When it is necessary to transmit data to the data receiving side wireless communications device, the data receiving side wireless communications device may transmit to the data transmission side wireless communications device a frame receipt acknowledgment (ACK) that is transmitted to the data transmission side wireless communications device connected together with the data that it is necessary to transmit.

The data transmission side wireless communications device may set, after a determined number of frames have been transmitted (for example, after a few frames have been transmitted), a determined inter frame space (SIFS+Trfb) that is sufficient for the data receiving side wireless communications device to transmit data.

Moreover, according to another embodiment of the invention, there is provided a wireless communications device that performs data communication with another wireless communications device. The wireless communications device of the invention includes an access control portion that performs asymmetric IFS access control. More specifically, a connection is established with the other wireless communications device, and once the connection is established, a transmission side inter frame space assigned to the other wireless communications device and a receiving side inter frame space assigned to the data receiving side wireless communications device are asymmetrically assigned.

According to the above-described structure, after the connection is established, asymmetric IFS access control is performed instead of random back-off control. As a result, control is performed such that surrounding nodes are only detected when it is necessary to transfer data. Thus a method is provided that allows the process of establishing, maintaining and disconnecting a wireless connection for data transfer to be performed more efficiently. The described wireless communications device of the invention is particularly useful in a wireless communications system in which data transfer is performed sporadically, or in a wireless communications system that has a small wireless service area.

The wireless communications device of the present invention can be applied in various ways. A variety of examples of these applications are described below.

The access control portion may perform, until the connection with the other wireless communications device is established, random back-off access control in which bandwidth is evenly distributed to the wireless communications device and the other wireless communications device. As a result of performing access control using a random back-off until the connection is established, it is possible to reduce collision of response transmissions in the case that a plurality of wireless communications devices are present within the wireless communication range.

After the connection with the other wireless communications device is established, the access control portion may continuously transmits data until data transmission is completed. By continuously transmitting data in this manner, it is possible to block transmissions from the other wireless communications device.

According to another embodiment of the present invention, there is provided a program that includes instructions that direct a computer to function as the above-described wireless communications device of the invention. In addition, the present invention also provides a computer-readable recording medium on which the program is recorded. Note that, the program may be programmed using any program language. Further, as the recording medium, a recording medium that is capable of recording the program and that is presently used, such as, for example, a CD-ROM, A DVD-ROM, or a floppy disk may be used. Alternatively, the recording medium may use any type of recording medium developed in the future.

According to the embodiments of the present invention described above, after the connection is established, asymmetric IFS access control is performed instead of random back-off control. As a result, control is performed such that surrounding nodes are only detected when it is necessary to transfer data. Thus a method is provided that allows the process of establishing, maintaining and disconnecting a wireless connection for data transfer to be performed more efficiently. The described wireless communications device is particularly useful in a wireless communications system in which data transfer is performed sporadically, or in a wireless communications system that has a small wireless service area. Other favorable benefits of the present invention are explained in the description of the preferred embodiment of the invention below.

DETAILED DESCRIPTION OF THE PREFERRED EMBODIMENTS

Figure 1:
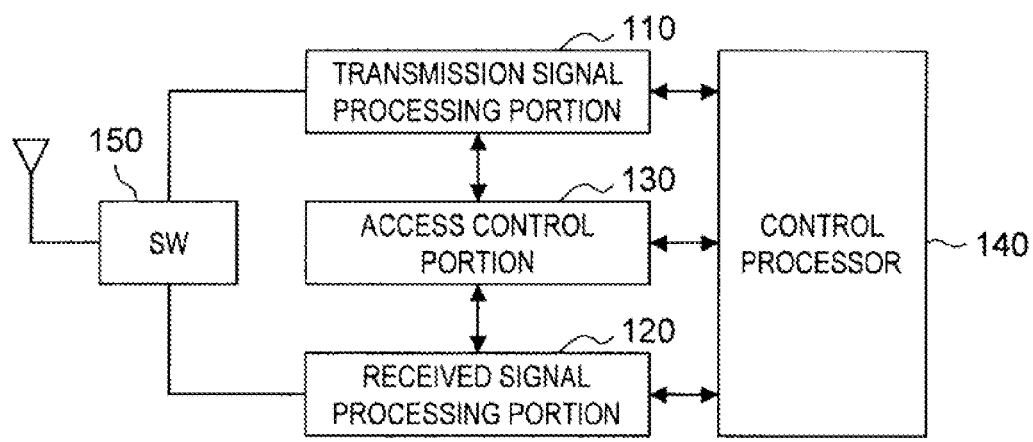
FIG. 1 is an explanatory figure that shows the structure of a wireless communications device according to a first embodiment of the present invention.

Hereinafter, preferred embodiments of the present invention will be described in detail with reference to the appended drawings. Note that, in this specification and the appended drawings, structural elements that have substantially the same function and structure are denoted with the same reference numerals, and repeated explanation of these structural elements is omitted.

First, preferred embodiments of the present invention will be explained. A fundamental assumption of this explanation is that the wireless communications system is defined as follows in accordance with the communication range.

(1) Close contact (ISO/IEC 10536): Communication range up to 2 millimeters (2) Close proximity (ISO/IEC 14443): Communication range up to 10 centimeters (3) Close vicinity (ISO/IEC 15693): Communication range up to 70 centimeters In the present embodiment, a wireless communications system used for, among the above mentioned ranges, (2) close proximity communication, will be explained. One example of a close proximity wireless communications system is a system using non-contact integrated circuit (IC) cards (hereinafter called by their generally used name "smart cards").

Figure 13:
FIG. 13 is an explanatory figure that shows an example in which a wireless service area is small.

In a close proximity wireless communications system, importance is placed on bandwidth protection between the wireless communications devices (terminals) rather than on preventing interference and even distribution of wireless bandwidth. More specifically, in a close proximity wireless communications system, it is extremely unlikely that interference will occur with wireless communications system in the surrounding area. For example, in the example shown in FIG. 13, it is extremely unlikely that communication between devices #1 and #2 will have an impact of communication between devices #3 and #4. Further, even if interference does occur, it is possible for the position of the pair of devices #1 and #2 and the position of the pair of devices #3 and #4 shown in FIG. 13 to be separated slightly to prevent interference. Accordingly, the devices #1 to #4 can mutually maintain good communication. Moreover, the communication range, which is a few centimeters, can easily be adjusted by the user. Thus, the key issue of concern is bandwidth protection between the wireless communications devices, rather than preventing interference and even distribution of wireless bandwidth. Hereinafter, favorable embodiments of the present invention will be explained while focusing on this consideration. Note that, in the following explanation, a wireless communications device will be referred to as a node.

(1) Example Structure of a Wireless Communications Device (FIG. 1)

An example structure of a wireless communications device 100 according to the present invention will be explained with reference to FIG. 1.

The wireless communications device 100 includes a transmission signal processing portion 110, a received signal processing portion 120, an access control portion 130, a control processor 140, and a switch 150.

The transmission signal processing portion 110 performs processing such as assembling a transmission frame, attaching a preamble, RFTx and the like. The received signal processing portion 120 performs processing such as detecting the preamble, RFRx, analyzing the received frame, identifying the frame and the like. The access control portion 130 controls the transmission timing. The transmission timing will be described in more detail later. The control processor 140 is a processor for controlling the transmission signal processing portion 110, the received signal processing portion 120, and the access control portion 130. The transmission signal processing portion 110 and the received signal processing portion 120 are connected to an antenna that is switched by the switch 150.

Figure 2:
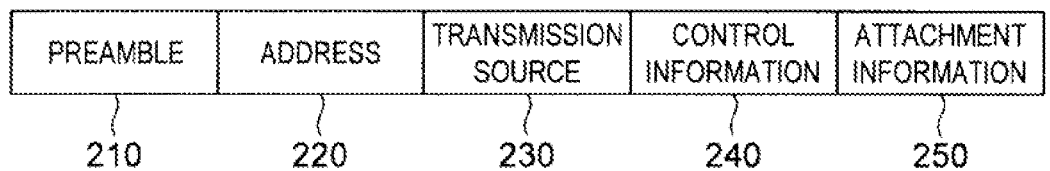
FIG. 2 is an explanatory figure that shows a transmission frame.

(2) Example of the Structure of a Transmission Frame (FIG. 2)

Next, an example of the structure of a transmission frame that is transmitted by the wireless communications device 100 will be explained with reference to FIG. 2.

A transmission frame 200 includes, as shown in FIG. 2, a preamble 210, an address field (address) 220, a transmission source field (transmission source) 230, control information 240 and attachment information 250.

The preamble 210 is fixed length data (for example, 56 bit), that is configured by a repeating pattern, namely, "1" and "0", for clock synchronization. The address field 220 is set to the address node of the transmission frame 200, and the transmission source field 230 is set to the node that is the source of the transmission frame 200 that is being transmitted. The control information 240 indicates wireless connection control information such as connection requirement (C-Req), connection acceptance (C-Acc), disconnection (C-Rls), frame receipt acknowledgement (ACK), data frame (DATA), and frame information etc. The attachment information 250 is set as attribute information that corresponds with the various types of control information.

The wireless communications device 100 shown in FIG. 1 includes a unique ID (UID) for specifically identifying each node. When the frame is transmitted, the specific node UID is set in the transmission source field 230 in order to indicate the transmission source of the frame as shown in FIG. 2. Further, an unspecified paging unique ID (UnSP-UID) may be specified as a special destination address. This UnSP-UID indicates that the destination has not been specified, and thus instructs each node to receive the frame. The UnSP-UID corresponds to what is commonly referred to as a broadcast address. In the system of the present embodiment, the UID can be switched in order to allow handling of a plurality of wireless communications devices, as will be described hereinafter.

The received signal processing portion 120 of the wireless communications device 100 uses the information of the address 220 and the transmission source 230 as a basis for determining whether a given frame is to be received.

Figure 3:
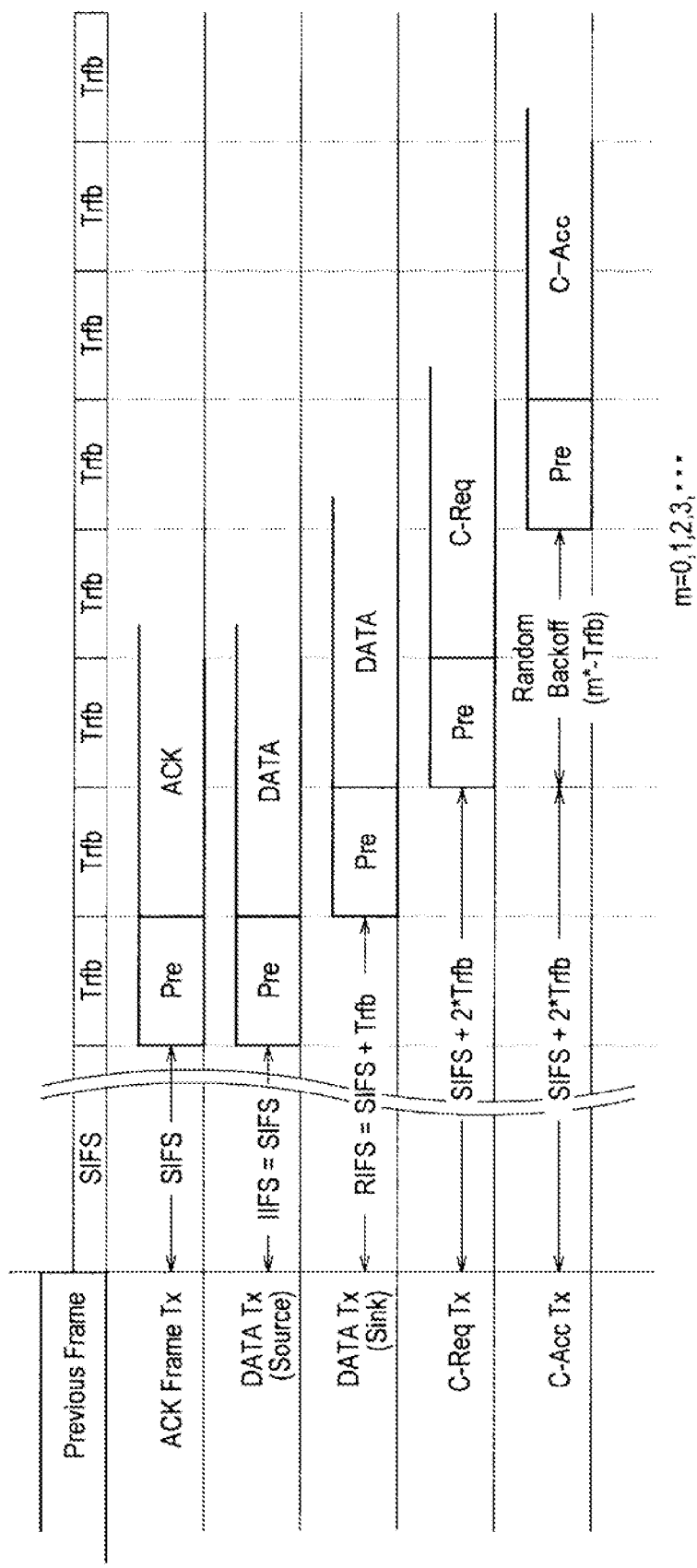
FIG. 3 is an explanatory figure that shows spaces between frames.

(3) Inter Frame Space (FIG. 3)

Next, the inter frame space (IFS), which is a key feature of the present embodiment, will be explained with reference to FIG. 3.

The inter frame space, as shown in FIG. 3, is represented by the time interval between a previous frame and the next frame. In the present embodiment, as can be seen in FIG. 3, the inter frame space is specified for an ACK frame (ACK Frame Tx), transmission data of the data transmission side node (DATA Tx (Source)), data receiving side transmission data (DATA Tx (Sink), a connection request (C-Req), and a connection acceptance (C-Acc Tx). [0042] The ACK frame is for confirming receipt of the DATA and the C-Acc frame. The Source indicates the node that transmits the data, and the Sink indicates the node that receives the data. Further, in FIG. 3, initiator inter frame space (IIFS; note that, the term initiator indicates the Source node) represents the IFS assigned to the source side, and responder inter frame space (RIFS; note that, the term responder indicates the Sink node) represents the IFS assigned to the Sink side.

In the next frame following the inter frame space, Pre corresponds to the preamble 210 shown in FIG. 2. ACK/DATA/C-Req/C-Acc represent the sections following the address 220 shown in FIG. 2, and include information such as the address/transmission source etc.

As shown in FIG. 3, the inter frame spacing of the ACK frame (ACK Frame Tx) is a short inter frame space (SIFS). The inter frame space IIFS of the transmission data of the data transmission side node (DATA Tx (Source))=SIFS, and the inter frame space RIFS of the data receiving side transmission data (DATA Tx (Sink))=SIFS=SIFS+Trfb. Note that, Trfb represents the time required to detect the preamble. In the case that carrier wave detection is performed, Trfb corresponds to the time required to detect the carrier wave. The inter frame space of the connection request (C-Req Tx) is SIFS+2*Trfb, and the inter frame space of the connection acceptance (C-Acc Tx) is SIFS+2*Trfb with m*Trfb added, which is a random back-off.

In FIG. 3, frames that have a short inter frame space are given priority over frames that have a long inter frame space for transmission.

For example, in the case that a C-Req frame is transmitted because it is necessary to transmit a connection request (C-Req) to a given wireless communications device (Device #a), this situation corresponds to the case of the connection request (C-Req Tx) shown in FIG. 3, and it is not possible to transmit the connection request (C-Req) until after an inter frame space SIFS+2*Trfb following completion of the previous frame.

On the other hand, in the case that a wireless communications device (Device #b) that is performing data transfer transmits data, this situation corresponds to transmission data (DATA Tx (Source)) shown in FIG. 3, and it is possible to transmit the data after the inter frame space SIFS following completion of the previous frame.

In other words, the Device #b has priority over the Device #a for transmitting the data, and the Device #a must wait until the time interval SIFS+2*Trfb has elapsed before transmitting the connection request (C-Req).

In this manner, in the present embodiment, the Source node can start transmitting the frame after IIFS (a period that is equal to SIFS) following completion of the previous frame. On the other hand, the Sink node cannot transmit the frame until after RIFS (=SIFS+Trfb: i.e., a period that is longer than SIFS by Trfb). Accordingly, the same IFS (inter frame space) is not assigned (symmetrically) to the Source node and the Sink node, and instead, an IFS of IIFS (=SIFS) is assigned to the Source node, and an IFS of RIFS (=SIFS+Trfb) is assigned to the Sink node. As a result, the access control method used in the present embodiment is referred to as "asymmetric IFS access control".

Figure 4:
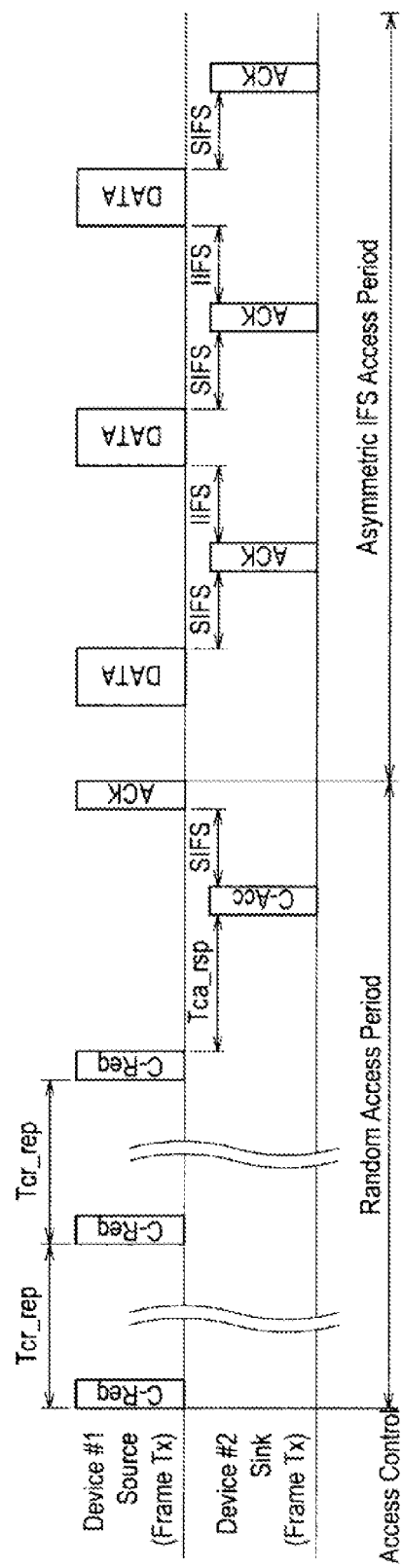
FIG. 4 is an explanatory figure that shows the timing of data communication.

(4) Access Control Period (FIG. 4)

Next, the access control period, which is a key feature of the present embodiment, will be explained with reference to FIG. 4.

In the present embodiment, until connection is established, access control is performed using a random back-off, and once connection is established, access control is performed using an asymmetric IFS.

In FIG. 4, the random access period is a period during which access control is performed using the random back-off, and the asymmetric IFS access period is a period during which access control is performed using an asymmetric IFS.

As can be seen in FIG. 4, in the random access period, the Source node transmits the connection request (C-Req) at the interval Tcr-rep. Following this, after Tca_rsp, the Sink node transmits the connection acceptance (C-Acc). Then, after SIFS, the Source node transmits the receipt acknowledgement (ACK). More details of the random access period (wireless connection establishment phase) will be explained later.

As shown in FIG. 4, in the asymmetric IFS access period, the Source node transmits data, and then following SIFS, the Sink node transmits a receipt acknowledgement (ACK). This process is repeated such that data is consecutively transmitted until the data transmission is completed. More details of the asymmetric IFS access period (data transfer phase) will be explained later.

Next, an example of the operation of the access method of the present embodiment will be explained based on the assumption that the wireless communications system has a relatively small wireless service area. Key features of the access method of the present embodiment are that the access method only detects surrounding nodes when there is a need to transfer data, and uses a wireless connection.

Operation in the Wireless Connection Establishment Phase

When there is no need to transfer data, in order to promote reduced power consumption, each node switches periodically between a receiving state and a power supply off state while waiting for a signal from a surrounding node.

Referring to FIG. 4, if Device #1 (the Source node) needs to make a data transfer, a connection request (C-Req) frame signal is periodically transmitted to surrounding nodes. Note that, the method disclosed in Japanese Patent Application Publication No. JP-A-2006-148906 (Sony, Germany) is used for the intermittent receiving interval, and the C-Req transmission interval/period. However, this is merely one example of a technology for transmitting the frame signal, and is not a central feature of the explanation of the present embodiment. Accordingly, a detailed explanation will be omitted here.

When connecting with a specific node, the UID of the specified node is set for the address. If the node to be connected with is not specified, UnSP_UID (unspecified paging unique ID) is set for the address, and the C-Req frame is transmitted.

Next, the positional relationship of Device #1 and Device #2 will be explained with reference to FIG. 5 and FIG. 6.

Figure 5:
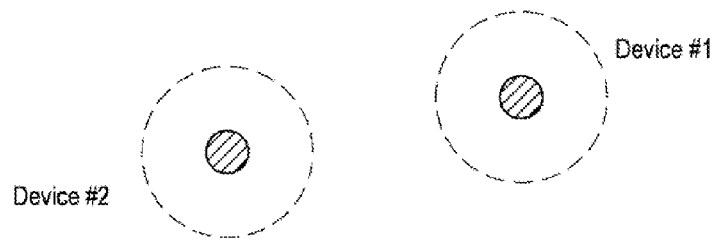
FIG. 5 is an explanatory figure that shows communication ranges of devices.
Figure 6:
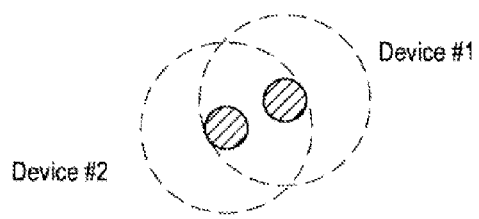
FIG. 6 is an explanatory figure that shows the communication ranges of the device.

In the situation shown in FIG. 5, the positional relationship of Device #1 and Device #2 is such that Device #2 cannot receive the signal from Device #1. However, in the situation shown in FIG. 6, Device #2 is able to receive the signal from Device #1. Device #2, which detects the C-Req frame, recognizes the connection request from Device #1 based on the transmission source field included in the C-Req frame. In response to the connection request, Device #2 transmits a C-Acc frame to Device #1 as a connection acceptance for the connection request. The C-Acc frame transmission source field is set to the UID of Device #2, and the UID of Device #1 is set for the address field. Then, the C-Acc frame is transmitted.

When the C-Acc frame is received from Device #2, Device #1 transmits a receipt acknowledgement (ACK) frame in response to the C-Acc frame. The UID of Device #1 is set for the transmission source filed of the ACK frame, and UID of Device #2 is set for the address field. The above described routine is used to exchange UIDs and identify the communication partner node prior to data transfer. Furthermore, in the data transfer phase, processing to allow receipt of frames from nodes other than the identified partner is not performed. Once data transfer is completed, both nodes delete information about the partner node's UID, and prepares for the next connection.

In the period from transmission of the C-Req until receipt of the ACK transmitted in response to the C-Acc, access to the wireless media is controlled using the random back-off. In this period, an access method using the random back-off is used because it is assumed that there is a situation like that shown in FIG. 10 (where there is also a Device #3), described hereinafter. In the situation shown in FIG. 10, UnSP=UID is set for the address of the C-Req frame of Device #1, and thus responses to C-Acc from Device #2 and Device #3 can be transmitted. Note that, in order to reduce C-Acc collision, it is favorable to control the timing of the response to C-Acc using a random back-off. However, if it can be anticipated that the response timing of the C-Acc will be random due to, for example, Device #2 and Device #3 having delays for transmission-receiving processing that are different, there is no need to perform C-Acc response timing control using a random back-off In addition, if the situation shown in FIG. 10 does not exist, or if there is no need to guarantee connection establishment in a situation like that shown in FIG. 10, there is no need to use a random back-off.

Operation in the Data Transfer Phase

Simultaneous to transmission of the ACK frame in response to the C-Acc frame, Device #1 switches the access control mode to the asymmetric IFS access control. In the same manner, Device #2, which receives the ACK frame in response to the C-Acc frame, switches the access control mode to the asymmetric IFS access control. Following switching, Device #1 immediately starts data transmission. It is preferable that Device #1 continuously transmits the data until the data transmission is completed.

As a result of continuously transmitting the data until data transmission is completed, in the wireless media, DATA-ACK-DATA-ACK-DATA-... frames are transmitted at SIFS intervals. Accordingly, transmissions from other Devices can be inhibited. At the time when the data transmission is completed, in order for Device #1 to instruct Device #2 to disconnect, a C-Rls frame is transmitted. The C-Rls frame is a frame that explicitly instructs the partner to disconnect. However, other methods could be used such as an implementation method in which when it is detected that frame transmission-receiving is not being performed for a certain period, connection is autonomously disconnected. Following the disconnection processing, the intermittent receiving operation is started.

Hereinabove, an example of the operation of the access method of the present embodiment has been explained. Next, processing that is performed when it is necessary to transmit to Device #2 in the data transfer phase, and processing that is performed when Device #3 (a third party node) is present will be explained.

Processing Performed when it is Necessary to Transmit to Device #2 in the Data Transfer Phase Device #2 becomes the data receiving side (the Sink side), and thus it is not possible to transmit unless the frame space is an interval of SIFS+Trfb or more. In this case, the following three methods (1) to (3) may be used.

Figure 7:
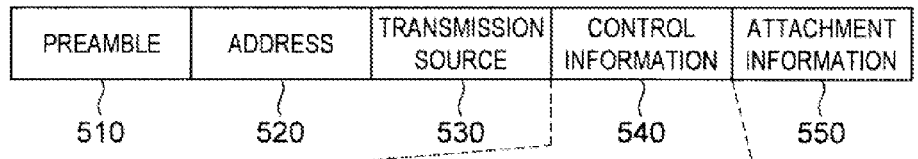
FIG. 7 is an explanatory figure that shows how processing (1) is performed to handle the need to transmit to a data receiving side in a data transmission phase.
Figure 7:
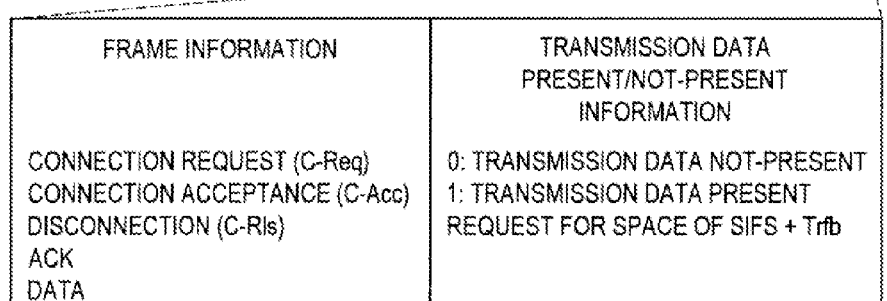

(1) A section of the information field of the ACK frame that is transmitted to Device #1 may be used to provide notification that there is data that needs to be transmitted from Device #2 to Device #1. Device #1 may then provide a frame space of SIFS+Trfb to allow transmission. For example, a transmission frame 500 shown in FIG. 7 includes a preamble 510, an address 520, a transmission source 530, control information 540, and attachment information 550. The control information 540 includes frame information 541 and transmission data present/not-present information 542. The frame information 541 is information that indicates one of the connection request (C-req), the connection acceptance (C-Acc), disconnection (C-Rls), ACK, and DATA. The transmission data present/not-present information 542 is, for example, 1-bit information indicating whether there is any transmission data, and can be set such that, for example, data "0", indicates that no transmission data is present, and data "1" indicates that transmission data is present.

Figure 8:
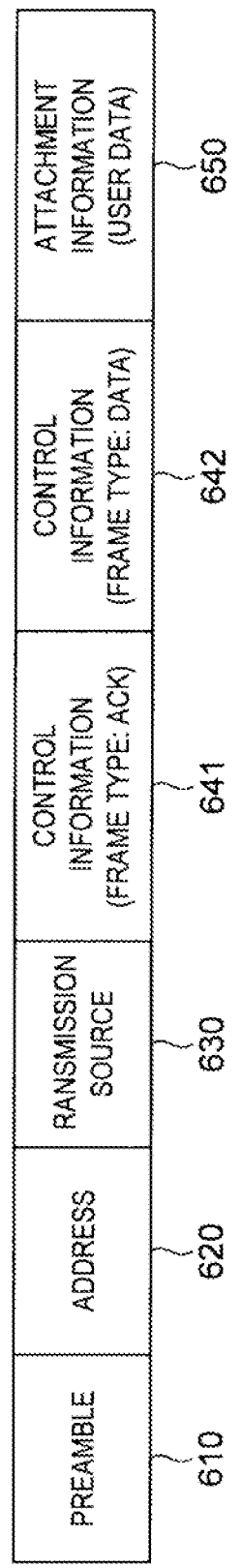
FIG. 8 is an explanatory figure that illustrates how processing (2) is performed to handle the need to transmit to the data receiving side in the data transmission phase.

(2) The ACK frame and the DATA frame may be connected and transmitted. For example, a transmission frame 600 shown in FIG. 8, includes a preamble 610, an address 620, a transmission source 630, control information 641, 642, attachment information 650. The control information 641 has an ACK frame type, and the control information 642 has a DATA frame type.

Figure 9:
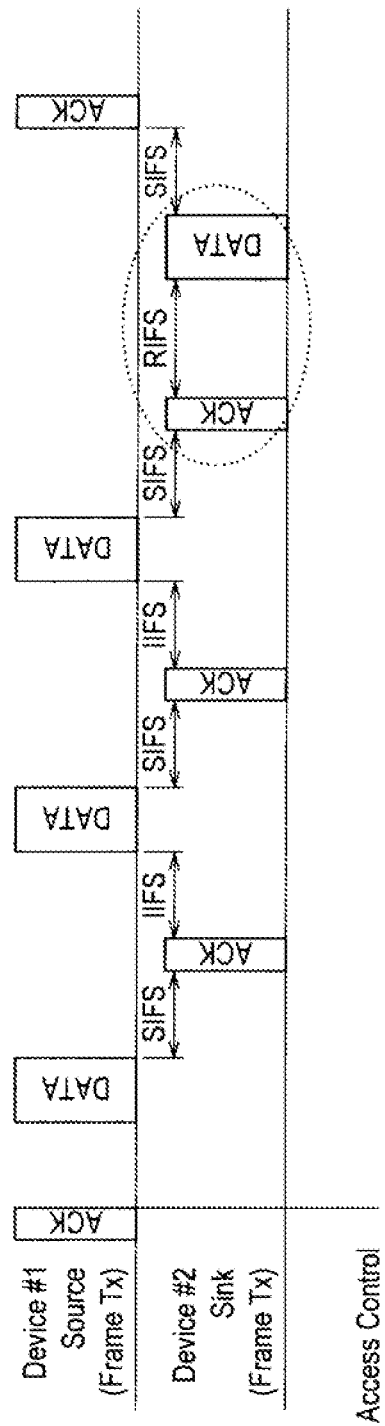
FIG. 9 is an explanatory figure that shows illustrates how processing (3) is performed to handle the need to transmit to the data receiving side in the data transmission phase.

(3) As indicated by dotted edged circle shown in FIG. 9, after transmission of a number of frames, Device #1 provides a frame space of RIFS=SIFS+Trfb, thereby creating a state in which Device #2 is able to transmit. Note that, the timing at which the frame space of RIFS=SIFS+Trfb is provided (namely, the number of frames that are transmitted before the frame space is provided) can be discretionarily set.

In order to avoid frame collision caused by simultaneous transmission of frames between Device #1 and Device #2 that have established a connection, the asymmetric IFS access control provides asymmetric spaces between frames. In the case that collision of frames between Device #1 and Device

2 is permitted, or simultaneous transmission by Device #1 and Device #2 is not possible for use-related reasons, there is no need to perform asymmetric setting.

Operation of Device #3 (Third Party Node)

Figure 10:
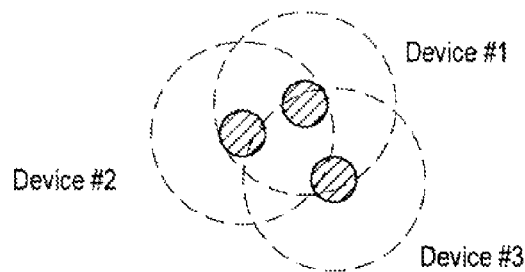
FIG. 10 is an explanatory figure that shows the operation of a third party node, and the communication ranges of devices.
Figure 11:
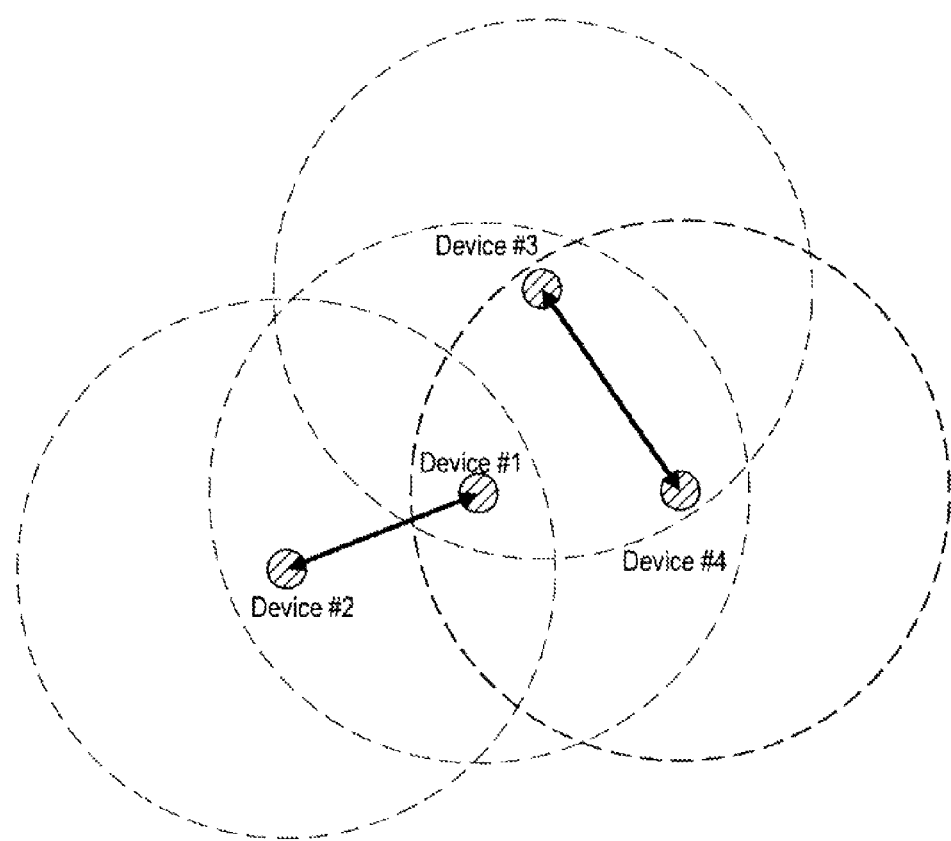
FIG. 11 is an explanatory figure that shows a known wireless communications system.
Figure 12:
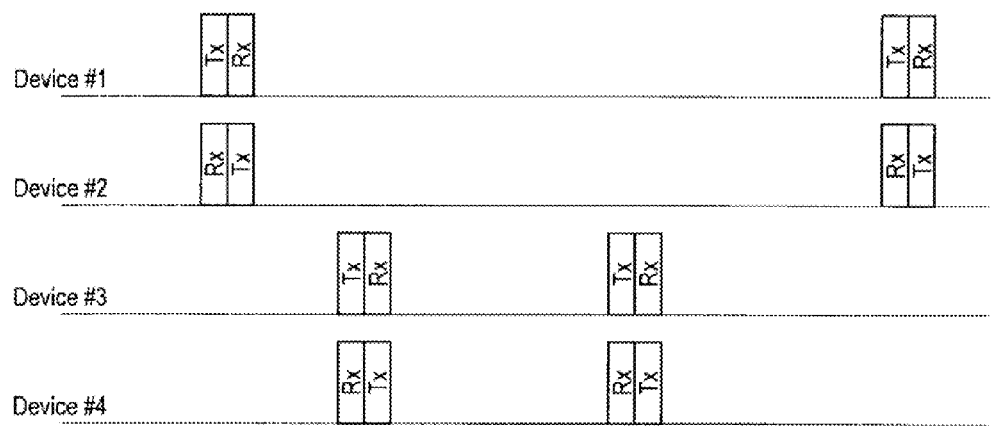
FIG. 12 is an explanatory figure that shows data transmission and receipt in the wireless communications system shown in FIG. 11.

The operation of Device #3 (third party node) in the case that connection has been established between Device #1 and Device #2 will now be explained with reference to FIG. 10.

Because Device #3 detects the preamble of the frame transmitted by another node (Device #2) immediately before transmitting C-Acc from its own node, Device #3 holds transmission of the C-Acc frame, and waits for the next transmission timing. However, at this time, if data transfer between Device #1 and Device #2 has started, DATA-ACK-DATA-ACK- . . . is being continuously transmitted in the wireless media, and thus there is no opportunity for transmission of C-Acc. When Device #3 detects that it is not possible to transmit C-Acc over a determined period, Device #3 halts transmission of C-Acc. Further, even if there is an opportunity to transmit C-Acc, Device #1 has established connection with Device #2, and thus does not respond to Device #3 using an ACK frame. Accordingly, in the case that Device #3 does not obtain an ACK frame in response to transmission of the C-Acc frame during a determined period, Device #3 halts transmission of C-Acc.

Other than using the above-described method, a method may be employed in which, if Device #3 detects a C-Acc frame transmitted by another node prior to its own transmission, Device #3 may halt transmission of its own C-Acc.

Hereinabove, the structure and operation of the wireless communications device 100 of the wireless communications system according to the present embodiment has been explained. The described wireless communications device 100 can be incorporated in a computer program that includes instructions that directs a computer to realize the above-described functions, thereby directing the computer to function as the wireless communications device 100. This computer program may be recorded on a recording medium (for example, a CD-ROM) or distributed to the market by being downloaded using an electronic network.

EFFECTS OF THE PRESENT EMBODIMENT

As described above, the present embodiment provides a more efficient method for use in a wireless communications system in which data transfer takes place sporadically or in a wireless communications system where the wireless service area is small. In this method, surrounding nodes are detected only when there is a need to transfer data, and the process of establishing, maintaining and disconnecting the wireless connection for transferring data is performed more efficiently. In addition, access control using a random back-off is performed until the connection is established, and thus collision of response transmissions can be reduced in the case that a plurality of wireless communications devices are present within the wireless communication range.

Moreover, the time required for data transfer is reduced, which has benefits from the point of view of power consumption and throughput. Further, switching of the UID allows handling of a plurality of wireless communications devices. In addition, the configuration does not use an IEE802.15.4 system that is typically used for ZigBee etc. or wireless LAN, and thus there is no need to perform communication for wireless bandwidth control in addition to normal communication. Accordingly, device structure can be simplified.

It should be understood by those skilled in the art that various modifications, combinations, sub-combinations and alterations may occur depending on design requirements and other factors insofar as they are within the scope of the appended claims or the equivalents thereof.

The present invention can be used for a wireless communications system or a wireless communications device, and is particularly useful for a close proximity wireless communications system that focuses on the importance of bandwidth protection between wireless communications devices, and a wireless communications device that forms a part of the close proximity wireless communications system.

What is claimed is:

1. A wireless communications system for performing data communications between wireless communications devices, the wireless communication system comprising:
   a data transmission side wireless communications device; and
   a data receiving side wireless communications device,
   wherein both the data transmission side wireless communications device and the data receiving side wireless communication device perform asymmetric IFS access control,
   wherein a connection is established between the data transmission side wireless communications device and the data receiving side wireless communications device, and after the connection is established,
   an inter frame space access control is performed in which a transmission side inter frame space assigned to the data transmission side wireless communications device and a receiving side inter frame space assigned to the data receiving side wireless communications device are asymmetrically assigned,
   wherein the transmission side inter frame space is shorter than the receiving side inter frame space and frames that have a short inter frame space are given priority over frames that have a long inter frame space and,
   wherein communication for wireless bandwidth control in addition to normal communication is not performed.

2. The wireless communications system according to claim 1, wherein until the connection of the data transmission side wireless communications system and the data receiving side wireless communications device is established, random back-off access control is performed in which bandwidth is evenly distributed to the data transmission side wireless communications device and the data receiving side wireless communications device.

3. The wireless communications system according to claim 1, wherein after the connection between the data transmission side wireless communications device and the data receiving side wireless communications device is established, the data transmission side wireless communications device continuously transmits data until data transmission is completed.

4. The wireless communications system according to claim 1, wherein
   the data transmission side wireless communications device transmits a connection request frame to surrounding wireless communications devices when it is necessary to transfer data,
   the data receiving side wireless communications device, which receives the connection request, transmits a connection acceptance frame to the data transmission side wireless communications device,
   the data transmission side wireless communications device transmits a response frame that responds to the connection acceptance and simultaneously switches access control to the asymmetric IFS access control, and
   the data receiving side wireless communications device, which receives the response frame, switches access control to the asymmetric IFS access control.

5. The wireless communications system according to claim 1, wherein when it is necessary to transmit data to the data receiving side wireless communications device, the data receiving side wireless communications device uses a section of an information field of a frame receipt acknowledgment that is transmitted to the data transmission side wireless communications device to provide notification to the data transmission side wireless communications device that there is data that needs to be transmitted from the data receiving side wireless communications device.

6. The wireless communications system according to claim 5, wherein when the data transmission side wireless communications device receives notification that there is data that needs to be transmitted from the data receiving side wireless communications device, the data transmission side wireless communications device sets a determined inter frame space that is sufficient for the data receiving side wireless communications device to transmit data.

7. The wireless communications system according to claim 1, wherein when it is necessary to transmit data to the data receiving side wireless communications device, the data receiving side wireless communications device transmits to the data transmission side wireless communications device a frame receipt acknowledgment that is transmitted to the data transmission side wireless communications device connected together with the data that it is necessary to transmit.

8. The wireless communications system according to claim 1, wherein the data transmission side wireless communications device sets, after a determined number of frames have been transmitted, a determined inter frame space that is sufficient for the data receiving side wireless communications device to transmit data.

9. A wireless communications device that performs data communication with another wireless communications device, the wireless communication device comprising:
an access control portion that, following establishment of a connection with the other wireless communications device, performs an inter frame space access control in which a transmission side inter frame space assigned to the other wireless communications device and a receiving side inter frame space assigned to the data receiving side wireless communications device are asymmetrically assigned,
wherein the transmission side inter frame space is shorter than the receiving side inter frame space and frames that have a short inter frame space are given priority over frames that have a long inter frame space,
wherein both of the wireless communications devices perform asymmetric IFS access control and,
wherein communication for wireless bandwidth control in addition to normal communication is not performed.

10. The wireless communications device according to claim 9, wherein the access control portion performs, until the connection with the other wireless communications device is established, random back-off access control in which bandwidth is evenly distributed to the wireless communications device and the other wireless communications device.

11. The wireless communications device according to claim 9, wherein after the connection with the other wireless communications device is established, the access control portion continuously transmits data until data transmission is completed.

* * * * *